June 7, 1932.   T. E. COLEMAN   1,862,255
LUBRICATION
Filed Oct. 26, 1929    2 Sheets-Sheet 1

Inventor
Thomas E. Coleman
By Dodge and Sons
Attorneys

June 7, 1932. T. E. COLEMAN 1,862,255
LUBRICATION
Filed Oct. 26, 1929 2 Sheets-Sheet 2
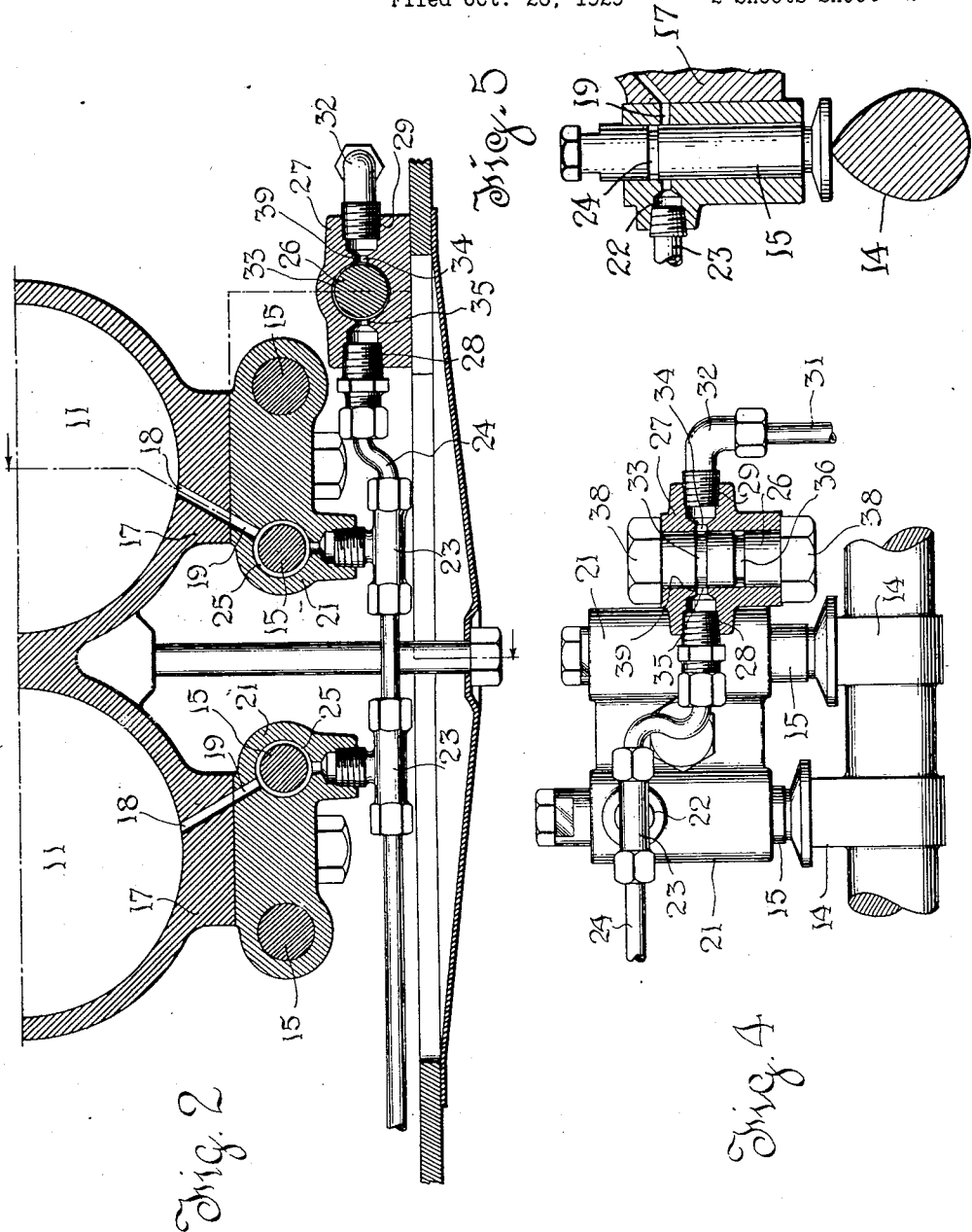
Inventor
Thomas E. Coleman
By Dodge and Sons
Attorneys Patented June 7, 1932

1,862,255

UNITED STATES PATENT OFFICE

THOMAS E. COLEMAN, OF MADISON, WISCONSIN, ASSIGNOR TO MADISON-KIPP CORPORATION, OF MADISON, WISCONSIN, A CORPORATION OF WISCONSIN

LUBRICATION

Application filed October 26, 1929. Serial No. 402,721.

This invention relates to lubricating devices for internal combustion engines and particularly to means for regulating the amount of oil fed to the side walls of the cylinder and piston at varying speeds of the engine.

The present standard circulating force feed systems which force oil through the crank shaft depend upon the oil thrown off the large end connecting rod bearings for cylinder lubrication. In the splash system the oil is thrown onto the cylinder from the large end connecting rod bearings dipping into the oil troughs. In both systems there is no accurate control of the oil reaching the cylinder barrels due to the fact that while at increased engine speeds the quantity of oil thrown by the connecting rods may increase, the path which this oil takes changes with varying speeds and no accurate delivery to the cylinder barrels can be provided. Attempts have been made to supply oil to cylinders and pistons at the increased speeds by opening, either manually or by the increased oil pressure, a valve, by-passing oil direct to the cylinder barrels from the main oil line under pressure. The results have been either over-lubrication or complete failure of operation because of stoppage of the small openings used in an attempt to prevent over-lubrication.

The present invention is designed to regulate accurately the flow of oil to the piston, so that at high engine speeds a correct amount of oil will be delivered to the cylinder walls and at the low speeds there will not be an excessive amount delivered to the cylinder walls, by providing a movable valve in the oil supply line, this valve being opened intermittently in timed relation with respect to the engine speed. Pressure reducing means are also provided in the oil line for the purpose of limiting the amount of lubricant fed to the piston at high speeds.

The invention will be more clearly understood from the following description taken in connection with the accompanying drawings, in which:—

Fig. 2 is a top plan view of a portion of an internal combustion engine, partly in section, illustrating the manner in which the movable valve and pressure regulating valve are connected to the engine cylinders.

Fig. 4 is a side view of the pressure regulating valve and its connections to the movable valve and pump, portions of the cam shaft and cylinder valve mechanism being illustrated.

Figure 1:
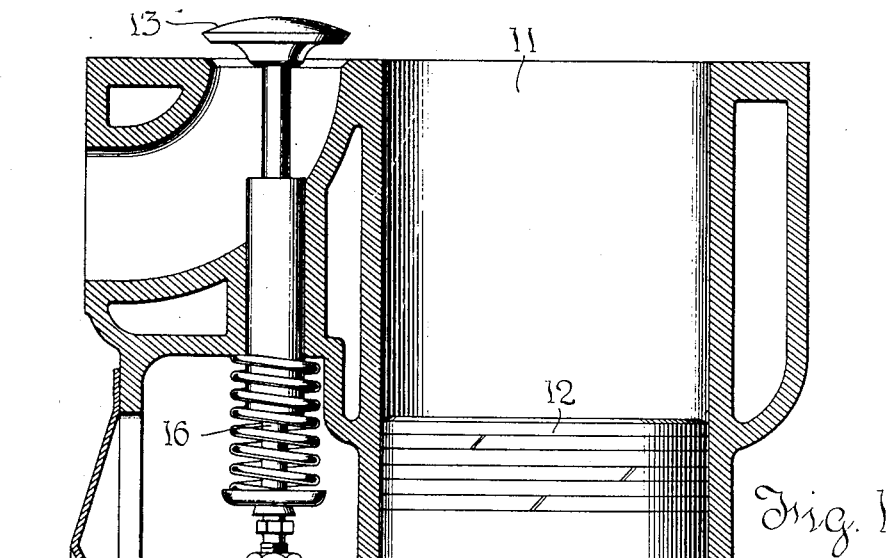
Fig. 1 is a sectional elevation of a portion of an engine showing the intermittently opening valve as a modified form of valve tappet.
Figure 3:
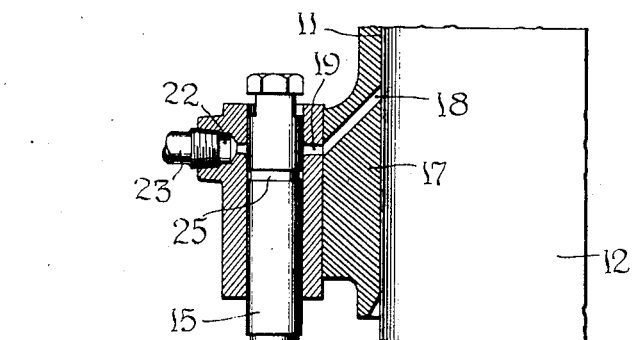
Fig. 3 is a partial view of the engine, the movable valve being in its closed position and certain of the parts being shown in section.

Referring to the drawings, the engine includes the usual cylinder 11, piston 12, and inlet and exhaust valves 13, only one of the valves being shown. The valves are opened and closed by cams 14 acting on tappets 15 interposed between the cams and the valve stems 16. While only one cylinder is shown in Fig. 1, it is to be understood that each cylinder of the engine is provided with the above referred to parts.

In the side wall 17 of each cylinder, on that side adjacent one of the tappets, there is provided an oil duct 18 which, as shown, is drilled in the wall of the cylinder and disposed angularly with respect to the axis thereof and near the bottom of the cylinder wall. The location of the duct may be higher or lower than that shown, however, depending on the requirements of the particular engine to be lubricated and, if desired, suitable piping to carry oil from the tappet to the duct may be provided. The outer end of duct 18 is in alinement with and communicates with a passage 19 in a tappet guide 21 which is tapped at 22 for connection with T-couplings 23 in the oil feed line 24. One or both of the tappets 15 for each cylinder is provided with an annular groove 25 adapted to be brought into alinement with passage 19 during reciprocation of the tappet, thus functioning as an intermittently opening valve for the passage of oil from the oil feed line 24 to the duct 18. It is apparent that this arrangement provides for a measured supply of lubricating oil to the piston and cylinder walls with each or every other stroke of the piston, depending on whether one or both valve tappets are grooved. It has been found in practice that excellent results are obtained with a single grooved tappet, however, and the invention has therefore been illustrated as having but one of the valves for each cylinder grooved.

Since the oil pump in engine lubricating systems is driven in timed relation with the engine, it is obvious that, as the engine speed increases, the pressure in the feed line will build up. It has been found that at high engine speeds there is a tendency for the oil pump to feed too great an amount of oil to the piston, resulting in over-lubricating and consequent fouling of the spark plugs. In order to restrict the flow of oil to the grooved tappets and oil ducts there is provided between the oil pump (not shown) and the tappets, a regulating plug or valve 26 designed to reduce the pressure of the oil in the oil feed line 24 and limit the amount of oil supplied to the walls of the cylinder through the tappet. The regulating plug is cylindrical in form and fits tightly in a bored casting 27. The latter is tapped at 28 and 29 to form a connection between the oil feed line 24 and the pump line 31, the latter through elbow 32. The taps are in alinement with each other and with a groove 33 in the regulating plug and the casting is drilled through, as at 34 and 35, so that oil will flow from the pump line, around the annular channel formed by groove 33 and the wall of the casting and thence to the oil feed line 24.

It is to be noted in Figs. 1 and 4 that the plug 26 is shown as having two grooves 33, 36. These grooves have different depths but are spaced a like distance from the ends of the plug. This arrangement of the grooves permits reversal of the ends of the plug so that that groove most suitable for the desired restriction of flow may be alined with the taps 28 and 29. The plug 26 is threaded at each end and secured in casting 27 by the nuts 38.

While it has been found in practice that the grooved plug effects restriction of the oil passage with little or no danger of clogging, the corners 39 formed at the junction of the drilled openings 34, 35, and the inner wall of casting 27 are chamfered further to prevent lodging of particles of solid matter in the oil passage.

It will be apparent that the herein described arrangement of valves and restricted passage for the lubricating oil supplied to the cylinder walls of the engine insures a proper supply of oil at all speeds of the engine. The oil is not only fed in timed relation with respect to the reciprocation of the piston but it is so throttled that at high engine speeds the danger of over-lubrication is minimized. It is obvious, for instance, that at low engine speeds the pump supplies little or no oil to the cylinders but as the engine attains higher speeds the pump tends to increase the pressure in the oil line. This is prevented, however, by the regulator or throttling plug, the resistance to flow increasing with increase in pump pressures.

A preferred form of the invention has been described, but the arrangement illustrated may be modified to meet the requirements of practice. The groove 25 in the tappet, for instance, is shown in Fig. 1 as being in alignment with passage 19 when the uppermost position of the tappet has been attained, but it has been found that equally good results are obtained when the groove overtravels the passage 19. In some respects, the latter arrangement is more desirable because two registrations of the groove and passage during a single reciprocation of the tappet are obtained. This permits finer regulation of the oil delivered to the cylinder walls, particularly when the invention is applied to exhaust valves, the cams of which hold the valves open for a relatively long period. Other modifications of like character are contemplated without departing from the general arrangement described herein.

What is claimed is:

1. In an internal combustion engine, a cylinder having an oil duct in the wall thereof; a control valve for said cylinder; means for opening said valve, including a reciprocable tappet; an oil supply line; and valve means in said tappet to connect said oil line and said duct, said last mentioned valve being opened by the means for opening said first mentioned valve.

2. In an internal combustion engine, a cylinder having an oil duct in the wall thereof; an oil supply line; a control valve for said cylinder; and means for opening said valve including a reciprocable tappet, said tappet having a passage for connecting said oil line and said duct during reciprocation of said tappet.

3. In an internal combustion engine, a cylinder having an oil duct in the wall thereof; an oil supply line; a control valve for said cylinder; and means for opening said valve including a reciprocable tappet, said tappet having a passage for connecting said oil line and said duct during reciprocation of said tappet, said passage being so positioned that it registers twice with said oil line and said duct during a single reciprocation of said tappet.

4. In an internal combustion engine, a cylinder having an oil duct in the wall thereof; an oil supply line; a control valve for said cylinder; and means for opening said valve including a reciprocable tappet, said tappet having a passage for connecting said oil line and said duct during reciprocation of said tappet, said passage being normally out of register with said oil line and said duct and so positioned that it overtravels said duct while moving in one direction and again overtravels the duct when moving in the opposite direction.

In testimony whereof I have signed my name to this specification.

THOMAS E. COLEMAN.